United States Patent Office 3,393,201
Patented July 16, 1968

3,393,201
1-METHYL OR 2-HYDROXY ETHYL-2-
CARBAMYL-5 NITROPYRROLES
Nicole Marie Préau, Sevres, France, assignor to Rhone-
Poulenc S.A., Paris, France, a French body corporate
No Drawing. Filed May 18, 1964, Ser. No. 368,381
Claims priority, application France, May 21, 1963,
935,564; Mar. 2, 1964, 965,763; Apr. 24, 1964,
972,256
6 Claims. (Cl. 260—326.3)

ABSTRACT OF THE DISCLOSURE

The invention provides new 5-nitropyrroles useful against protozoal infections caused, e.g. by amoebae, trichomonas, or histomonas, having the formula:

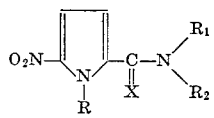

where R is a lower alkyl or lower hydroxyalkyl, $R_1$ is hydrogen or lower alkyl, and $R_2$ is lower alkyl, lower hydroxyalkyl, or, when R is lower hydroxyalkyl, hydrogen.

This invention relates to derivatives of 5-nitropyrrole, processes for their preparation, and pharmaceutical compositions, animal foodstuffs and concentrates containing them.

According to the present invention, there are provided the new 5-nitropyrrole derivatives of the general formula:

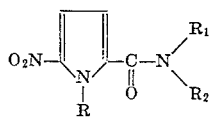   I (wherein R represents a hydrogen atom, an alkyl group containing 1 to 4 carbon atoms which may be substituted, or an aralkyl group, X represents an oxygen or sulphur atom or an imino group, and $R_1$ and $R_2$ are the same or different and each represents a hydrogen atom, an alkyl group containing 1 to 4 carbon atoms which may be substituted, or a cycloalkyl, phenyl or aralkyl group, or $R_1$ and $R_2$ together with the nitrogen atom to which they are attached represent a hydrazino group, or a mononuclear, saturated 5- or 6-membered heterocyclic group which may contain a second hetero atom selected from oxygen, sulphur and nitrogen, such as 1-pyrrolidinyl, piperidino, morpholino, or 1-piperazinyl, which may be substituted on the 4-position nitrogen atom by, for example, an alkyl group) and acid addition salts thereof. In this specification and accompanying claims the term "an alkyl group which may be substituted" indicates an alkyl group one or more of the hydrogen atoms of which may be replaced by groups selected from hydroxyl, alkoxy, aralkoxy, alkanoyloxy, mercapto, alkylthio, aralkylthio, carboxy, alkoxycarbonyl, cyano, carbamoyl, carbamoyl substituted by one or two alkyl groups, thiocarbamoyl, thiocarbamoyl substituted by one or two alkyl groups, amino, amino substituted by one or two alkyl groups, amidino, amidino substituted by alkyl groups, guanidino, guanidino substituted by alkyl groups, ureido and ureido substituted by alkyl groups, all the alkyl groups mentioned above containing at most 4 carbon atoms.

According to a feature of the invention, those compounds of Formula I wherein X represents an imino group and the symbols R, $R_1$ and $R_2$ are as hereinbefore defined, are prepared by the application to 2-cyano-5-nitropyrrole compounds of the general formula:

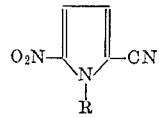   II wherein R is as hereinbefore defined, of methods known per se for converting a cyano group into a

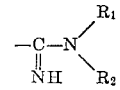

group, wherein $R_1$ and $R_2$ are as hereinbefore defined. In a preferred method a compound of Formula II is reacted with an alcohol of the general formula AOH, wherein A represents an alkyl group containing 1 to 4 carbon atoms, in the presence of hydrochloric acid, in order to obtain the hydrochloride of an imino-ether of the general formula:

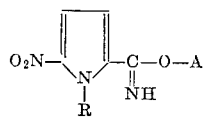   III wherein A and R are as hereinbefore defined, and the hydrochloride of the imino ether is reacted with an amine of the general formula:

   IV wherein $R_1$ and $R_2$ are as hereinbefore defined. In general, the hydrochlorides of the amidines of general Formula I, i.e. X represents the imino group, are thus obtained, but if the reaction is carried out in the presence of an excess of the amine of Formula IV the amidines of the invention may be obtained directly in the form of the bases. The hydrochlorides of the imino-ethers of general Formula III may, alternatively, be converted into corresponding bases and the bases reacted with an acid addition salt of an amine of general Formula IV to obtain the corresponding salts of amidines of the invention.

According to the reaction scheme used, the amidines of general Formula I may be very readily obtained in the form of acid addition salts or in the form of the base.

The preparation of the hydrochlorides of imino-ethers of Formula III is carried out in an anhydrous medium, preferably using the alcohol of formula AOH as reaction medium and keeping the reaction temperature near or below ambient temperature, i.e. 15°–25° C.

The preparation of the amidine bases of Formula I or salts thereof from the imino-ethers is also carried out in an anhydrous medium. A lower aliphatic alcohol such as ethanol or a compound which does not contain free hydroxyl groups, such as diethyl ether or dioxan, may be used as solvent.

According to a further feature of the invention, those compounds of Formula I, wherein X represents an oxygen atom and R, $R_1$ and $R_2$ are as hereinbefore defined, are prepared by the application of methods known per se for the preparation of amides. A preferred method comprises reacting an amine of Formula IV with a functional derivative of a pyrrole-2-carboxylic acid of the general formula:

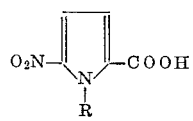   V wherein R is as hereinbefore defined. Preferably as the functional derivative a halide, particularly a chloride, an ester, particularly an ester of a lower alkanol, or the anhydride, of an acid of general Formula V is used. The appropriate reaction conditions will depend upon the functional devivative employed. In general the reaction is carried out in an inert organic solvent, such as an aromatic hydrocarbon (e.g. benzene, toluene or xylene), or in water, the reaction mixture being kept at a temperature near or below ambient temperature. It is particularly advantageous to use an acid-binding agent when an acid halide is used as starting material. For this purpose, an excess of the amine of general Formula IV, an organic base such as triethylamine, or an inorganic acid-binding agent, such as sodium bicarbonate, is preferably used.

Those compounds of Formula I wherein X represents an oxygen atom and $R_1$ and $R_2$ represent hydrogen atoms are, according to further features of the invention, prepared by (a) decomposition of the hydrochlorides of iminoethers of Formula III by treatment with an alkaline medium, e.g. aqueous sodium hydroxide, preferably with gentle heating, and (b) hydrolysis of the corresponding nitriles of Formula II by treatment with hydrogen peroxide, in a substantially neutral or alkaline medium, preferably with gentle heating.

According to another feature of the invention, the compounds of Formula I wherein X represents an oxygen atom and the grouping —$NR_1R_2$ represents a hydrazino group are prepared by the reaction of hydrazine hydrate with an ester of the general formula:

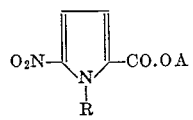

IV wherein A and R are as hereinbefore defined. It is particularly advantageous to use a lower aliphatic alcohol as solvent and to carry out the reaction at the boiling temperature of the solvent in the presence of an excess of hydrazine hydrate. In the starting material of general Formula VI, the symbol A preferably represents a methyl or ethyl group.

According to a still further feature of the invention, those compounds of Formula I wherein X repesents a sulphur atom, R is as hereinbefore defined, and $R_1$ and $R_2$ are the same or different and each represents a hydrogen atom, an alkyl group containing 1 to 4 carbon atoms which may be substituted, a cycloalkyl, phenyl or aralkyl group, or $R_1$ and $R_2$ together with the nitrogen atom to which they are attached represent a hydrazino group or a 5- or 6-membered heterocyclic group such as one of those hereinbefore specified, are prepared by the application to compounds of the general formula:

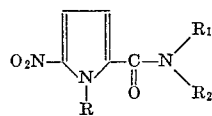

VII wherein R, $R_1$ and $R_2$ are as defined immediately above, by methods known per se for converting an amide or hydrazide group into a thioamide or thiohydrazide group without causing modification of a —$NO_2$ group. In the preferred method phosphorus pentasulphide is reacted with a compound of general Formula VII, the reaction advantageously being effected with the reactants in approximately equimolecular proportions, in a solvent such as benzene.

Compounds of the general formula:

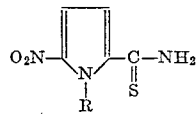

VIII wherein R is as hereinbefore defined, are prepared, according to another feature of the invention, by reaction of thioacetamide with a nitrile of Formula II. This reaction is preferably carried out at a temperature around 20° C. in the presence of dimethylformamide saturated with hydrogen chloride.

According to a still further feature of the invention, the compounds of Formula I are prepared by the nitration by methods known per se of a pyrrole derivative of the general formula:

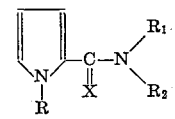

IX wherein X, R, $R_1$ and $R_2$ have the same meanings as defined in relation to compounds of general Formula I. This nitration is preferably carried out by reaction with nitric acid in the presence of acetic anhydride at a temperature below 0° C.

Certain compounds of general Fomula I may, in addition, be pepared from other compounds of general Formula I by methods known per se for introducing a group or converting one group into another, for example by the application of known methods for the introduction of an alkyl group on the nitrogen atom of a pyrrole nucleus, or for the formation of groups such as amidino, carbamoyl or carboxyl, from cyano groups. It is thus possible to prepare compounds of general Formula I wherein R represents an alkyl group which may be substituted, or an aralkyl group, the other symbols having the definitions given above relative to compounds of general Formula I, by reaction of a reactive ester of the general formula $R_3$—Y, wherein $R_3$ represents an alkyl group which may be substituted or an aralkyl group and Y represents a halogen atom or a sulphuric or sulphonic ester residue, with an alkali metal derivative, which may be prepared in situ, of a 5-nitropyrrole of the general formula:

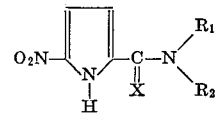

X wherein X, $R_1$ and $R_2$ are as hereinbefore defined. The reaction is preferably carried out in an inert organic solvent such as dimethylformamide, preferably at the boiling temperature of this solvent. When the compound $R_3$—Y is a sulphuric ester, Y is more especially a methoxysulphonyloxy or ethoxysulphonyloxy group. When $R_3$—Y is a sulphonic ester, Y is more especially a methanesulphonyloxy, ethanesulphonyloxy, benzenesulphonyloxy or toluene-p-sulphonyloxy group.

The conversion of one group into another is of particular interest for the preparation of compounds according to the invention wherein X represents an oxygen atom and $R_1$ and/or $R_2$ are substituted alkyl groups. Thus, for example, compounds wherein $R_1$ and/or $R_2$ represent amidinoalkyl, carbamoylalkyl or carboxyalkyl groups may be prepared from the corresponding compounds wherein $R_1$ and/or $R_2$ represent cyanoalkyl groups by methods known per se for the conversion of a nitrile into an amidine, an amide or an acid.

By the term "methods known per se" as used in this specification is meant methods heretofore used or described in the literature.

Compounds of general Formula I which possess basic properties may be converted into addition salts with acids by methods known per se. Thus, the addition salts may be prepared by the action of acids on a nitropyrrole compound of Formula I in an appropriate solvent, for example an alcohol such as ethanol or methanol. The salt formed is precipitated, if necessary after concentration of its solution, and is separated by filtration or decantation.

The new compounds of general Formula I and, where appropriate, their acid addition salts, possess interesting chemotherapeutic properties. They are more particularly useful against infections caused by protozoa such as certain species of amoebae (for example *Entamoeba histolytica*), trichomonas (for example *Trichomonas vaginalis*) or histomonas (for example *Histomonas maleagradis*).

Amongst the compounds of general Formula I, the most useful are those wherein R represents an alkyl (preferably methyl) group, X represents an oxygen atom, $R_1$ represents a hydrogen atom and $R_2$ represents an alkyl or hydroxyalkyl group, or $R_1$ and $R_2$ both represent alkyl groups or hydrogen atoms. Of outstanding importance are 2-N-(2-hydroxypropyl)carbamoyl-1-methyl - 5 - nitropyrrole, 2-N-methylcarbamoyl-1-methyl-5-nitropyrrole, 2-N-ethylcarbamoyl-1-methyl-5-nitropyrrole, 2 - N - isopropylcarbamoyl-1-methyl-5-nitropyrrole, 2-N,N - dimethylcarbamoyl-1-methyl-5-nitropyrrole, 2-N,N-diethylcarbamoyl-1-methyl-5-nitropyrrole, 2-carbamoyl-1-methyl-5-nitropyrrole and 1-(2-hydroxy-ethyl)-2-carbamoyl-5-nitropyrrole.

For therapeutic purposes, the 5-nitropyrrole derivatives of general Formula I are employed as such or, when appropriate, in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, piorates, fumarates, maleates, citrates, tartrates, salicylates, methanesulphonates, ethanedisulphonates, benzenesulphonates, and toluene p-sulphonates) so that the beneficial physiological properties inherent in the bases are not vitiated by side-effects ascribable to the anions.

The following examples illustrate the preparation of 5-nitropyrrole derivatives of the present invention.

Example I

A solution of crude 2-chlorocarbonyl-1-methyl-5-nitropyrrole (30.8 g.) in toluene (280 cc.) is added, with vigorous stirring, to a mixture of ethanolamine (24.4 g.) and anhydrous toluene (280 cc.) previously cooled to about 10° C., the temperature being kept below 15° C. The reaction mixture is allowed to stand at ambient temperature for 12 hours and water (50 cc.) then added with vigorous stirring. A precipitate forms which is collected and washed with water (3× 20 cc.), giving, after drying and recrystallising from isopropanol (200 cc.), 2-N-(2-hydroxyethyl)carbamoyl - 1 - methyl - 5 - nitropyrrole (24.2 g.), M.P. 118° C.

Crude 2-chlorocarbonyl-1-methyl-5-nitropyrrole (48 g.) (M.P. 31–32° C.) used as starting material is obtained by heating a suspension of (1-methyl-5-nitro-2-pyrrolyl))carboxylic acid (40 g.) in thionyl chloride (160 cc.) under reflux for about 30 minutes.

(1-methyl-5-nitro-2-pyrrolyl)carboxylic acid (97.7 g.), M.P. 205° C., is obtained by boiling a mixture of a solution of sodium hydroxide (55 g.) in water (300 cc.) and a solution of 2-ethoxycarbonyl-1-methyl-5-nitropyrrole (M.P. 37° C.) in ethanol (300 cc.) under reflux for about 10 minutes. The 2-ethoxycarbonyl - 1 - methyl - 5 - nitropyrrole is obtained by the hydrolysis of ethyl (1-methyl-5-nitro-2-pyrrolyl)carboximidate hydrochloride (144 g.) in water (1.4 litres) at 25° C. for 12 hours. Ethyl (1-methyl-5-nitro - 2 - pyrrolyl)carboximidate hydrochloride (240 g.) is prepared by reaction of gaseous hydrogen chloride with a suspension of 2-cyano-1-methyl-5-nitropyrrole (200 g.)), M.P. 88° C. (prepared according to H. J. Anderson, Can. J. Chem. 37, 2053 (1959)) in anhydrous ethanol (2 litres).

Example II

Proceeding as in Example I but commencing with 2-chlorocarbonyl-1-methyl - 5 - nitropyrrole (14.2 g.) and morpholine (14 g.), 1-methyl-2-morpholinocarbonyl-5-nitropyrrole (15.3 g.), M.P. 93° C., is obtained.

Example III

A solution of 2-chlorocarbonyl-1-methyl-5-nitropyrrole (10.5 g.) in benzene (100 cc.) is added, with vigorous stirring, to a mixture of n-butylamine (8.4 g.) in benzene (50 cc.) previously cooled to about 10° C. the temperature being kept below 15° C. The reaction mixture is allowed to stand for 2 hours at ambient temperature and water (50 cc.) then added with vigorous stirring. The organic layer is separated and washed with water (2× 20 cc.) Evaporation of the benzene and recrystallisation from diisopropyl ether gives 2-N-n-butylcarbamoyl-1-methyl-5-nitropyrrole (8.8 g.) in the form of pink crystals, M.P. 56° C.

Example IV

Proceeding as in Example III but commencing with 2-chlorocarbonyl-1-methyl-5-nitropyrrole (19 g.) and dimethylamine (25 g.), 2 - N,N - dimethylcarbamoyl-1-methyl-5-nitropyrrole (15 g.) is obtained, after recrystallisation from diisopropyl ether, in the form of pale yellow needles, M.P. 96° C.

Example V

Proceeding as in Example III but commencing with 2-chlorocarbonyl-1-methyl-5-nitropyrrole (7.5 g.), N-isobutylcyclododecylamine (9.9 g.) and trimethylamine (4.2 g.), washing with water, evaporating the benzene, triturating with heptane and recrystallising from aqueous ethanol, 2 - (N - isobutyl-N-cyclododecyl)carbamoyl-1-methyl-5-nitropyrrole (9.7 g.), M.P. 92° C., is obtained.

Example VI

A current of gaseous monomethylamine is passed, with stirring and cooling, into a solution of 2-chlorocarbonyl-1-methyl-5-nitropyrrole (19 g.) in anhydrous benzene (100 cc.) previously cooled to 5° C. After saturation, stirring is continued for 2 hours and water (50 cc.) then added. The precipitate formed is collected, washed freely with water (5×50 cc.) and recrystallised from boiling isopropanol (400 cc.) in the presence of decolourising charcoal, giving 1-methyl-2-N-methylcarbamoyl-5-nitropyrrole (12.6 g.) in the form of fine pale yellow needles, M.P. 192° C.

Example VII

A slow current of gaseous ammonia is passed for 15 minutes into a suspension of ethyl (1-methyl-5-nitro-2-pyrrolyl))carboximidate hydrochloride (25 g.), prepared as described in Example I, in anhydrous ethanol A130 cc.), previously cooled to −20° C. The temperature is kept between −20° C. and −15° C. during the passage of the ammonia and the solution obtained is then poured into ice-water (500 cc.) and rapidly extracted with anaesthetic-grade diethyl ether (3×300 cc.). After washing with water (100 cc.) and drying over sodium sulphate, evaporation of the ether gives ethyl (1-methyl-5-nitro-2-pyrrole)carboximidate (21.2 g.) in the form of a yellow coloured oily base.

The base thus obtained is heated under reflux for 4 hours with a solution of ammonium methanesulphonate (12.1 g.) in absolute ethanol (200 cc.). After decolourising with animal charcoal and allowing to cool to about 30° C., anaesthetic-grade diethyl ether (750 cc.) is added. A white crystalline precipitate forms which is collected and dried, giving 2-amidino - 1 - methyl - 5 - nitropyrrole methanesulphonate (20.6 g.), M.P. about 150° C.

This methanesulphonate is dissolved in ice-water (50 cc.) and made alkaline by addition of aqeuous ammonium hydroxide solution containing about 14% ammonia (40 cc.), the temperature being kept at 0° C. The yellow crystalline precipitate formed is immediately collected giving, after washing with ice-water and drying, 2-amidino-1-methyl-5-nitropyrrole (8.6 g.), M.P. 147° C. This base is dissolved, with warming, in ethanol (30 cc.) and anhydrous 15% ethereal hydrogen chloride (15 cc.) added to the solution obtained. After the addition of diisopropyl ether (100 cc.), crystallisation commences. The crystals formed are collected and recrystallised from boiling isopropanol (200 cc.), giving, after cooling, filtering and drying, 2-amidino-1-methyl-5-nitropyrrole hydrochloride (6.8 g.), 1st M.P. 190–195° C., 2nd M.P. 211° C.

Example VIII

A solution of 2-ethoxycarbonyl-1-methyl-5-nitropyrrole (21 g.) and hydrazine hydrate (10.5 g.) in ethanol (200 cc.) is boiled for 24 hours. After cooling, filtering and drying, yellow crystals (17.5 g.), M.P. about 205° C., are obtained which are recrystallised from boiling water (750 cc.) in the presence of animal charcoal, giving (1-methyl-5-nitro-2-pyrrolyl)carboxylic acid hydrazide (14.5 g.), M.P. 205° C.

Example IX

2 - N - (3 - ethoxy-3-iminopropyl)carbamoyl-1-methyl-5-nitropyrrole hydrochloride (30.1 g.) is dissolved in a solution containing about 15% ammonia in anhydrous ethanol (150 cc.). After several minutes at ambient temperature, crystallisation commences. The mixture is allowed to stand in a refrigerator for 12 hours and the yellow solid formed collected and dried (25.5 g.), M.P. 227° C. This product is recrystallised from boiling methanol (450 cc.), to which boiling diisopropyl ether (150 cc.) is added after filtration. After leaving to crystallise, separating and drying, 2-N-(2-amidinoethyl)-carbamoyl-1-methyl-5-nitropyrrole hydrochloride (21.4 g.), M.P. 228° C. is obtained.

The iminoether hydrochloride used as starting material is obtained quantitatively by the passage of gaseous hydrogen chloride into a suspension of 2-N-(2-cyanoethyl) carbamoyl-1-methyl-5-nitropyrrole (22 g.) in absolute ethanol (90 cc.) kept at a temperature below 8° C.

2 - N - (2 - cyanoethyl)carbamoyl-1-methyl-5-nitropyrrole (69.6 g.), M.P. 119° C. is obtained by the condensation of 3-aminopropionitrile (56 g.) with 2-chlorocarbonyl-1-methyl-5-nitropyrrole (68 g.) in toluene (600 cc.).

Example X

Anhydrous gaseous hydrogen chloride is passed into a solution of 2-cyano-5-nitropyrrole (26 g.) in anhydrous ethanol (250 cc.) at a temperature kept below 0° C. A whitish crystalline precipitate forms in proportion to the saturation. The reaction mixture is allowed to return to ambient temperature over 12 hours and precipitation of ethyl (5 - nitro-2-pyrrolyl)carboximidate hydrochloride (39 g.) completed by the addition of anhydrous diethyl ether (500 cc.). This hydrochloride (18 g. is suspended in anhydrous ethanol (180 cc.) and treated with a solution containing about 15% of ammonia in anhydrous ethanol (160 cc.). When the exothermic reaction has finished, the reaction is completed by passing gaseous ammonia into the medium and then heating at 35–40° C. for 5 hours. A clear yellow solution is obtained which is allowed to stand for 12 hours at ambient temperature. Evaporation of the ethanol under reduced pressure gives a yellow solid which is washed carefully with water to remove ammonium chloride. 2-amidino-5-nitropyrrole (11.3 g.) thus obtained is converted into the hydrochloride by the addition of 15% anhydrous ethereal hydrogen chloride solution (25 cc.) to a suspension of the base (11 g.) in methanol (50 cc.) giving 2-amidino-5-nitropyrrole hydrochloride (11.1 g.), M.P. above 270° C.

Example XI

2 - N - (2 - amidinoethyl)carbamoyl-1-methyl-5-nitropyrrole hydrochloride (9.5 g.), obtained as described in Example IX, is dissolved in N sodium hydroxide solution (70 cc.) at 20° C. After 15 hours, the precipitate formed is collected, washed with water and dried, giving 2-N-(2-carbamoylethyl)carbamoyl - 1-methyl-5-nitropyrrole (7.3 g.), M.P. 169° C. after recrystallisation from water (80 cc.) in the presence of decolourising charcoal.

Example XII

Proceeding as in Example VIII, but commencing with 2-ethoxycarbonyl-5-nitropyrrole (10 g.) and hydrazine hydrate (8.3 g), (5-nitro-2-pyrrolyl)carboxylic acid hydrazide (8.5 g.) is obtained, M.P. about 295° C. (with decomposition).

Example XIII

A solution of 2-chlorocarbonyl-5-nitropyrrole (259 g.) in anhydrous toluene (3 litres) is added dropwise with stirring to a solution of morpholine (380 g.) in anhydrous toluene (1.5 litres) previously cooled to 5° C., the temperature being kept below 10° C. When the addition is complete (2 hours), the reaction mixture is allowed to return to ambient temperature and stirring condtinued for 15 hours. The precipitate formed is then collected, washed with diethyl ether (4×100 cc.) and dissolved in distilled water (1.5 litres). The solution obtained is treated with methylene chloride (1 litre) and acidified with 30% aqueous hydrochloric acid (500 cc.) with stirring and cooling to 15° C. The organic phase is decanted and the aqueous phase extracted with methylene chloride (4×250 cc.). The organic extracts are combined and, after washing with 15% hydrochloric acid (200 cc.) and water (200 cc.), dried over sodium sulphate and evaporated, giving 2-morpholinocarbonyl-5-nitropyrrole (280.6 g.) in the form of a yellow crystalline solid, M.P. 145° C.

2-chlorocarbonyl-5-nitropyrrole used as starting material (M.P. 70–72° C.) may be obtained quantitatively by heating a mixture of (5-nitro-2-pyrrolyl)carboxylic acid (225 g.) and phosphorus pentachloride (312 g.) slowly to 60° C. over 1 hour.

Example XIV

A 9.5% solution of sodium ethoxide in ethanol (54 cc.) is added at 20° C. to a suspension of 2-morpholinocarbonyl-5-nitropyrrole (16.9 g. prepared as described in Example XIII) in absolute ethanol (500 cc.) After stirring for 2 hours, dimethylformamide (40 cc.) is added to the reaction mixture and the ethanol removed under reduced pressure at a temperature below 50° C. giving a reddish solution of the sodio derivative of 2-morpholinocarbonyl-5-nitropyrrole, to which is added a solution of diethyl sulphate (15.4 g.) in dimethylformamide (25 cc.). The reaction mixture is boiled for 15 minutes and then allowed to stand overnight at ambient temperature. A brown solution is thus obtained which is poured into icewater (600 cc.). A light beige precipitate then forms which is collected, washed with 5% sodium carbonate solution (3×50 cc.) followed by distilled water (3×50 cc.) and purified in boiling methanol (75 cc.) in the presence of animal charcoal. After filtering, adding distilled water (100 cc.) previously heated to 50° C. to the filtrate, cooling, filtering and drying 1-ethyl-2-morpholinocarbonyl-5-nitropyrrole (14 g.), M.P. 100° C. is obtained.

Example XV

A solution of propyl iodide (17 g.) in dimethylformamide (40 cc.) is added to a mixture of dimethylformamide and the sodio derivative of 2-morpholinocarbonyl-5-nitropyrrole (16.9 g.) prepared as described in Example XIV. After boiling for 30 minutes and cooling, the orange-red solution obtained is poured into icewater (700 cc.). A colourless precipitate forms which is purified as described in Example XIV giving, after drying, 1-propyl-2-morpholinocarbonyl-5-nitropyrrole (7.5 g.), M.P. 81–82° C.

Example XVI

Proceeding as in Example XIV but adding a solution of n-butyl iodide (18.4 g.) in dimethylformamide (25 cc.) to the solution of the sodium salt of 2-morpholinocarbonyl-5-nitropyrrole (16.9 g.)in dimethylformamide and boiling for 15 minutes, a brown solution is obtained which, after cooling, is treated with water (600 cc.). A brown solid forms which is washed as in Example XIV and recrystallised from a mixture of ethanol and water, giving 1 - n - butyl - 2-morpholinocarbonyl-5-nitropyrrole (14.7 g.), M.P. 88–89° C.

Example XVII

Proceeding as in Example XIV but adding iso-butyl iodide (21.6 g.) to the solution of the sodium salt of 2-morpholinocarbonyl-5-nitropyrrole (18 g.) in dimethylformamide and boiling for 30 minutes, a strongly coloured solution is obtained which, after cooling, is treated with ice-water (800 cc.). A blackish oil forms which is extracted with methylene chloride (250 cc. and 3× 100 cc.). The organic phase is washed with dilute (5%) sodium hydroxide solution followed by water, dried and evaporated. A gum (11 g.) is obtained which slowly solidifies (M.P. 45° C.) and is treated with boiling methanol (75 cc.) in the presence of animal charcoal. After filtration, water (150 cc.) is added. Beige crystals (6.9 g.), M.P. 58° C., precipitate which are purified by chromatography on alumina in diisopropyl ether and recrystallisation from aqueous methanol, giving 1-isobutyl-2-morpholinocarbonyl-5-nitropyrrole (4.5 g.) in the form of slightly yellow crystals, M.P. 66° C.

Example XVIII

Proceeding as in Example XIV but adding benzyl chloride (25 g.) to the solution of the sodium salt of 2-morpholinocarbonyl-5-nitropyrrole (22.5 g.) in dimethylformamide (100 cc.) and boiling for 1 hour, a suspension is obtained which is treated with acetone (100 cc.) and filtered. The filtrate is evaporated under reduced pressure. The gummy residue obtained is triturated with diisopropyl ether (100 cc.) giving, after filtering and drying, crystals (31 g.), M.P. 92° C. Recrystallisation from a mixture of isopropanol (150 cc.) and diisopropyl ether (50 cc.) gives 1-benzyl - 2-morpholinocarbonyl - 5-notropyrrole (21.2 g.), M.P. 98° C.

Example XIX

Proceeding as in Example XIV but adding ethylene chlorohydrin (24.1 g.) to the solution of the sodium salt of 2-morpholinocarbonyl-5-nitropyrrole (22.5 g.) in dimethylformamide (150 cc.) and heating at 140° C. for 2 hours, cooling and evaporating the dimethylformamide under reduced pressure, the residue is treated with water (100 cc.) and chloroform (100 cc.). After stirring until solution occurs, the aqueous layer is decanted and extracted with chloroform (3× 50 cc.). The organic extracts are washed with 10% aqueous sodium carbonate solution (3×50 cc.) and water (3×50 cc.), dried over sodium sulphate and evaporated, giving crystals (15.3 g.), M.P. 120° C. Recrystallisation from boiling methanol (50 cc.) gives 1-(2-hydroxyethyl)-2-morpholinocarbonyl-5-nitropyrrole (11.2 g.), M.P. 132° C. A further recrystallisation from methanol gives a product, M.P. 134° C.

Example XX

Proceeding as in Example XIV but adding 1-acetoxy-2-chloroethane (16.4 g.) to the solution of the sodium salt of 2-morpholinocarbonyl-5-nitropyrrole (20 g.) in dimethylformamide (130 cc.) and heating for 90 minutes at 140–145° C., cooling and evaporating the dimethylformamide, the residue is treated with chloroform and water and extracted and washed as in Example XIX. The product obtained by evaporation of the chloroform is triturated with petroleum ether (20 cc.) and methanol (5 cc.) and recrystallised from boiling methanol (10 cc.), giving 1-(2-acetoxyethyl) - 2-morpholinocarbonyl-5-nitropyrrole (4.16 g.), M.P. 82–84° C.

Example XXI

Proceeding as in Example XIV but adding benzyloxyethyl toluene-p-sulphonate (3.06 g.) to the solution of the sodium salt of 2-morpholinocarbonyl-5-nitropyrrole (2.25 g.) in dimethylformamide (15 cc.) and heating for 30 minutes at 140–145° C., cooling and evaporating the dimethylformamide under reduced pressure, the residue is treated with water and chloroform and extracted and washed as in Example XIX. After drying and evaporating the chloroform, a brown-black residue is obtained which is purified in boiling methanol in the presence of animal charcoal, giving 1-(2-benzylovyethyl)-2-morpholinocarbonyl-5-nitropyrrole (1 g.), M.P. 76° C.

Example XXII

Proceeding as in Example XIV but adding N,N-diethylchloroacetamide (11.3 g.) to the solution of the sodium salt of 2-morpholinocarbonyl-5-nitropyrrole (11.3 g.) in dimethylformamide (100 cc.) and heating for 30 minutes at 145° C., cooling and evaporating the dimethylformamide under reduced pressure, a gummy residue is obtained which is solidified in dilute (13%) sodium hydroxide solution. After filtering, washing to neutrality and drying, 1-(N,N-diethylcarbamoyl)methyl - 2-morpholinocarbonyl-5-nitropyrrole (8.6 g.), M.P. 117° C. is obtained. After purification by dissolving in boiling benzene (25 cc.), filtering and precipitating with petroleum ether (60 cc.), the product (7.4 g.) melts at 119–120° C.

Example XXIII

A solution of monomethylamine in isopropanol (38.7%; 34 cc.) is added to a solution of 2-ethoxycarbonyl-1-methyl-5-nitropyrrole (8.5 g.) in isopropanol (65 cc.). After 3 hours, the clear solution obtained commences to crystallise and is left for 12 hours at ambient temperature. The precipitate is collected and washed with isopropanol previously cooled to 0° C., giving 1-methyl-2-N-methylcarbamoyl-5-nitropyrrole (6.8 g.), M.P. 192–193° C.

Example XXIV

A solution of 2-chlorocarbonyl-1-methyl-5-nitropyrrole (12.5 g.) in anhydrous xylene (80 cc.) is added with stirring to a solution of anhydrous monoethylamine (6.1 g.) in xylene (80 cc.) previously cooled to 0° C., the temperature being kept below 15° C. The reaction medium is allowed to return to ambient temperature and, after standing for 12 hours, treated with distilled water (50 cc.). The insoluble fraction is filtered off, washed with water and dried, giving 2-N-ethylcarbamoyl-1-methyl-5-nitropyrrole (7.2 g.), M.P. 102° C. A second crop (4.2 g.) may be obtained by evaporation of the reaction xylene and recrystallisation of the residue from diisopropyl ether.

Example XXV

A solution is prepared of 2-ethoxycarbonyl-1-methyl-5-nitropyrrole (20 g.) and anhydrous monoethylamine (50 g.) in methanol (100 cc.). After 48 hours at ambient temperature, the methanol is evaporated under reduced pressure giving 2-N-ethylcarbamoyl - 1-methyl-5-nitropyrrole (20 g.), M.P. 102° C., identical to the product obtained in Example XXIV.

Example XXVI

Proceeding as in Example XXIV but replacing the monoethylamine by isopropylamine (8 g.), a fraction (13.7 g.), M.P. 138° C., is obtained which is insoluble in water and xylene. Recrystallisation from isopropanol (100 cc.) gives 2-N-isopropylcarbamoyl-1-methyl-5-nitropyrrole (11.1 g.), M.P. 139° C.

Example XXVII

Proceeding as in Example XXIV but replacing the monoethylamine by diethylamine (9.9 g.) and allowing to stand for 12 hours, the organic solution obtained is washed with water (50 cc. and 3× 20 cc.). The xylene is evaporated and crystals (14.5 g.), M.P. 81° C., obtained. Recrystallisation from diisopropyl ether (80 cc.) gives 2-N,N-diethylcarbamoyl-1-methyl-5-nitropyrrole (12 g.), M.P. 82° C.

Example XXVIII

A solution of 2-chlorocarbonyl-1-methyl-5-nitropyrrole (11 g.) in toluene (100 cc.) is added to a solution of pyrrolidine (8.4 g.) in toluene (100 cc.) at a temperature below 10° C. After standing for 12 hours, the mixture is washed with water (100 cc. and 2×50 cc.) and evaporated on a waterbath under reduced pressure, giving 1-methyl-5-nitro-2-1'-pyrrolidinylcarbonylpyrrole (13 g.), M.P. (after recrystallisation from diisopropyl ether) 76° C.

Example XXIX

Proceeding as in Example XXVIII but replacing the pyrrolidine by piperidine (10 g.), 1-methyl-5-nitro-2-piperidinocarbonylpyrrole (13.3 g.), M.P. about 70° C., is obtained after washing and evaporating the organic phase. After recrystallisation from aqueous methanol the product (11 g.) melts at 73° C.

Example XXX

Proceeding as in Example XXVIII but replacing the pyrrolidine by 1-methylpiperazine (11.8 g.), 1-methyl-2-(4-methyl-1-piperazinyl)carbonyl-5-nitropyrrole (13.1 g.), M.P. about 80° C., is obtained after washing and evaporating the organic phase. After recrystallisation from diisopropyl ether (150 cc.) the product (8.9 g.) melts at 79° C.

Example XXXI

Proceeding as in Example XXVIII but commencing with 2-chlorocarbonyl-1-methyl-5-nitropyrrole (4 g.) and benzylamine (4.7 g.), the benzylamine hydrochloride formed is filtered off and the filtrate evaporated. Recrystallisation of the evaporation residue from a boiling mixture of isopropanol (40 cc.) and diisopropyl ether (20 cc.) gives 2-N-benzylcarbamoyl-1-methyl-5-nitropyrrole (4.1 g.), M.P. 105° C.

Example XXXII

A solution of 2-chlorocarbonyl-1-methyl-5-nitropyrrole (8 g.) in xylene (50 cc.) is added to a solution of 1-amino-propan-2-ol (6.5 g.) in a mixture of xylene (25 cc.) and chloroform (25 cc.) with stirring at a temperature below 10° C. After allowing the reaction mixture to return to ambient temperature, water (50 cc.) is added with stirring. The insoluble material is filtered off and washed carefully with water. Drying gives a solid (8.2 g.), M.P. about 110° C. Evaporation of the organic phase of the filtrate previously washed with water gives more solid product (1.5 g.), M.P. about 110° C. These two solids are combined and recrystallised from boiling water (120 cc.) in the presence of animal charcoal, giving 2-N-(2-hydroxypropyl)carbamoyl-1-methyl-5-nitropyrrole (8.3 g.), M.P. 124–125° C.

Example XXXIII

Proceeding as in Example XXXII but commencing with 1-amino-propan-3-ol (9.8 g.) and 2-chlorocarbonyl-1-methyl-5-nitropyrrole (12 g.), 2-N-(3-hydroxypropyl)carbamoyl-1-methyl-5-nitropyrrole (7.3 g.), M.P. 78° C., is obtained after recrystallisation from a boiling mixture of isopropanol and diisopropyl ether.

Example XXXIV

A solution of 2-chlorocarbonyl-1-methyl-5-nitropyrrole (7.4 g.) in xylene (100 cc.) is added, dropwise at 10° C., to a solution of N-methyl-ethanolamine (2.92 g.) and triethylamine (3.94 g.) in xylene (40 cc.). After standing for 12 hours at ambient temperature, the precipitate formed is collected, washed with water and dried, giving a product (7 g.), M.P. about 100–130° C., which is treated with boiling isopropanol (350 cc.). On cooling, 1-methyl-2-[N-methyl-N-(2-1'-methyl-5'-nitro-2'-pyrrolyl-carbonyloxyethyl)carbamoyl]-5-nitropyrrole (1.8 g.), M.P. 147° C., precipitates.

The isopropanolic filtrate is evaporated and the residue obtained treated with boiling butanone (30 cc.). Insoluble material is filtered off, the filtrate evaporated and the residue recrystallised from boiling benzene (55 cc.), giving 1-methyl-2-(N-methyl-N-2'-hydroxyethylcarbamoyl)-5-nitropyrrole (1.8 g.), M.P. 88° C.

Example XXXV

A solution of 2-chlorocarbonyl-1-methyl-5-nitropyrrole (3.7 g.) in toluene (20 cc.) is added, dropwise with stirring at a temperature between 0 and 5° C., to a solution of β-alanine (1.8 g.) in sodium hydroxide solution (4%; 40 cc.). Stirring is continued for 1 hours at a temperature between 0 and 5° C. and the reaction mixture then allowed to come to ambient temperature. After decanting, the aqueous phase is washed with toluene (2×15 cc.) and acidified, with stirring at 0° C., with sulphuric acid (20%; 12 cc.). A product (4.1 g.), M.P. 150° C., is obtained, after filtration, which is purified by washing with boiling diisopropyl ether and recrystallising the insoluble material from boiling water (25 cc.) giving 2-N-(2-carboxyethyl)carbamoyl-1-methyl-5-nitropyrrole (3.3 g.), M.P. 153° C.

Example XXXVI

2-N-(2-carboxyethyl)carbamoyl-1-methyl-5-nitropyrrole (0.1 g.), identical to the product obtained in Example XXXV, is obtained by boiling a solution of 2-N-(2-carbamoylethyl)carbamoyl-1-methyl-5-nitropyrrole (0.24 g.) (prepared as described in Example XI) in sodium hydroxide solution (4%; 2 cc.) for 1 hour, acidifying after cooling, extracting with ethyl acetate and recrystallising the extracted product from isopropanol.

Example XXXVII

A nitrating mixture of nitric acid ($d=1.49$; 1.5 cc.) and acetic anhydride (2.3 cc.), previously cooled to —10° C., is added over 15 minutes, with vigorous stirring at a temperature between —10° and 0° C., to a solution of 2-N,N-dimethylcarbamoyl-1-methylpyrrole (2.28 g.) in acetic anhydride (10 cc.) previously cooled to —10° C. After stirring at —10° C. for a further 15 minutes, the reaction mixture is poured onto crushed ice (100 g.), extracted with methylene chloride (5×70 cc.), washed rapidly with water (3×50 cc.), dried and the organic phase evaporated. The blackish gum (2.4 g.) which is obtained is dissolved in benzene (65 cc.), treated at laboratory temperature with animal charcoal (2 g.), filtered and passed through a column of alumina (20 g.) to separate the resins. Elution is effected with benzene (130 cc.) and evaporation of the eluted benzene gives a product (1 g.), M.P. about 80–100° C., which consists principally of a mixture of derivatives nitrated, respectively, in the 4- and 5-positions. These compounds are separated by chromatography through silica by suspending their mixture in petroleum ether (250 cc.) and eluting the 5-nitro isomer with diethyl ether. Crystals (0.39 g.), M.P. 94–96° C., are thus obtained which are recrystallised from diisopropyl ether (9 cc.), giving 2-N,N-dimethylcarbamoyl-1-methyl-5-nitropyrrole (0.31 g.), M.P. 95–96° C., identical to the product obtained in Example IV.

Example XXXVIII

Rectified dimethylformamide (150 cc.), previously cooled to 0° C., is saturated until the mass solidifies with anhydrous hydrogen chloride. 2-cyano-1-methyl-5-nitropyrrole (30 g.) and thioacetamide (30 g.) are then added with the most thorough mixing possible. After about 1 hour, a bright yellow suspension is obtained which can be stirred mechanically. Stirring is continued at laboratory temperature for 48 hours. A clear, orange solution is slowly formed which is evaporated at 50° C. in vacuo. The residue is treated with crushed ice (200 g.), neutralised with saturated sodium bicarbonate solution until evolution of gas ceases, collected, washed with ice-water (3×50 cc.) followed by trichlorethylene (6×50 cc.) and dried. The crude product (22 g.), M.P. 138° C., obtained is purified by dissolving in dimethylformamide (100 cc.), treating with animal charcoal at ambient temperature and precipitating with water (350 cc.), giving 1-methyl-5-nitro-2-thiocarbamoylpyrrole (19.1 g.), M.P. 142° C.

Example XXXIX

Proceeding as in Example XXVIII but commencing with aniline (9.8 g.) and 2-chlorocarbonyl-1-methyl-5-nitropyrrole (9.4 g.), a suspension is obtained which is treated with water (50 cc.) and filtered. The precipitate is washed, successively, with water (50 cc.), 3.6% hydrochloric acid (50 cc.) and water (2× 25 cc.). The crude product obtained is dissolved in dimethylformamide (80 cc.) at 60–70° C., treated with animal charcoal, filtered and the filtrate added to water (120 cc.), giving, after filtering and drying, 1-methyl-5-nitro-2-phenylcarbamoylpyrrole (10.5 g.) in the form of a yellow powder, M.P. 152° C.

Example XL

A current of gaseous ammonia is passed into a solution of 2-chlorocarbonyl-5-nitropyrrole (4 g.) in anhydrous toluene (25 cc.) cooled externally by an ice-bath. A yellow precipitate is formed. When absorption of ammonia is complete, the reaction mixture is treated with water (25 cc.), acidified to pH 3 by the addition of 15% hydrochloric acid and insoluble material filtered off. The filtrate is evaporated and the product obtained recrystallised from boiling water. There is finally obtained 2-carbamoyl-5-nitropyrrole (1.4 g.), M.P. 190–191° C.

Example XLI

A suspension of (1-methyl-5-nitro-2-pyrrole)carboxylic acid (15 g.) in thionyl chloride (60 cc.) is heated gently on a water-bath and the reaction mixture refluxed until evolution of gas is complete (about 30 minutes). Excess thionyl chloride is then evaporated under reduced pressure. Anhydrous toluene (20 cc.) is added and the last traces of thionyl chloride evaporated, giving crude 2-chlorocarbonyl - 1 - methyl-5-nitropyrrole (M.P. 31–32° C.). This acid chloride is dissolved in anhydrous toluene (75 cc.). The solution obtained is cooled externally with a bath of ice-water and a current of gaseous ammonia passed in, the temperature of the mixture being kept below 15° C. A yellow crystalline precipitate forms immediately. After about 45 minutes the medium is saturated with ammonia. The mixture is allowed to stand for about 2 hours and water (20 cc.) added. The precipitate obtained is filtered off, washed with water and dried, giving, after recrystallisation from boiling ethanol, 2-carbamoyl-1-methyl-5-nitropyrrole (11 g.) in the form of yellow needles, M.P. 176° C.

(1-methyl-5-nitro-2-pyrrolyl)carboxylic acid (97.7 g.), M.P. 205° C., used as starting material is obtained by boiling a mixture of a solution of sodium hydroxide (55 g.) in water (300 cc.) and a solution of 2-ethoxycarbonyl-1-methyl-5-nitropyrrole, M.P. 37° C. in ethanol (300 cc.) for about 10 minutes. The 2-ethoxycarbonyl-1-methyl-5-nitropyrrole is obtained by the hydrolysis of ethyl (1-methyl - 5-nitro-2-pyrrolyl)carboximidate hydrochloride (144 g.) in water (1.4 litres) at 25° C. for 12 hours. This latter compound (240 g.) is obtained by the reaction of gaseous hydrogen chloride with a suspension of 2-cyano-1 - methyl - 5 - nitropyrrole [prepared according to H. J. Anderson, Can. J. Chem. 37, 2053 (1959); 200 g.], M.P. 88° C., in anhydrous ethanol (2 litres).

Example XLII

Ethyl (1 - methyl-5-nitro-2-pyrrolyl)carboximidate hydrochloride (2.33 g.) is mixed with N sodium hydroxide solution (15 cc.) and boiled for 5 minutes. The reaction mixture is then cooled and the crystals formed collected and dried, giving 2 - carbamoyl-1-methyl-5-nitropyrrole (1.5 g.), M.P. 176° C., identical to the product of Example XLI.

Ethyl (1 - methyl-5-nitro-2-pyrrolyl)carboximidate hydrochloride used as starting material may be prepared as described in the last example.

Example XLIII

A 6 N aqueous solution of sodium hydroxide (1.8 cc.) is added to a solution of 1-(2-hydroxyethyl)-2-cyano-5-nitropyrrole (7.0 g.) in 95% ethanol (200 cc.) and 30% hydrogen peroxide (15 cc.), and heated at 50° C. for 3 hours. After cooling, the reaction mixture is neutralised with 4 N hydrochloric acid and concentrated to small volume under a pressure of about 30 mm. Hg. The residual crystalline slurry is filtered, washed with water and dried to constant weight in a desiccator under a pressure of about 50 mm. Hg. There is thus obtained 1-(2-hydroxyethyl)-2-carbamoyl-5-nitropyrrole (5.5 g.) which, after recrystallisation from ethyl acetate, is in the form of a yellow-beige crystalline powder, M.P. 175–176° C.

The 1-(2-hydroxyethyl)-2-cyano-5-nitropyrrole used as starting material is obtained in the following manner:

Dimethylformamide (400 cc.) is added to a solution of 2 - cyano - 5 - nitropyrrole (20.8 g) and sodium ethoxide (11.4 g.) in anhydrous ethanol (260 cc.), and the ethanol is removed by distillation under a pressure of about 50 mm. Hg by heating the reaction mass to 70–75° C. The monochlorohydrin of glycol (36 g.) is then added and the mixture heated under reflux for 4 hours. After cooling, the solvents are distilled off, at first under a pressure of 50 mm. Hg and then under a pressure of 0.4 mm. Hg. The residue is treated with water (400 cc.) and chloroform (900 cc.), the organic phase is separated and washed successively with water, a 5% solution of sodium carbonate, and once again with water. The chloroformic solution is dried over anhydrous sodium sulphate and concentrated to dryness under a pressure of about 50 mm. Hg. The crystalline residue istreated with chloroform (15 cc.), the crystals present filtered off, washed with the same solvent (a few cc.) and dried to constant weight in a dessicator under a pressure of about 50 mm. Hg. There is thus obtained 1-(2-hydroxyethyl)-2-cyano-5-nitropyrrole (14.05 g.) which, after recrystallisation from a benzene-cyclohexane mixture (1:1), is in the form of creamy-white crystalline powder, M.P. 114–115° C.

The present invention includes within its scope pharmaceutical compositions which comprise at least one of the compounds of general Formula I or, when appropriate, a nontoxic salt thereof, in association with a pharmaceutically acceptable carrier or coating. In clinical practice the compounds of the present invention will normally be administered orally, parenterally, rectally or locally.

Solid compositions for oral administration include compressed tablets, pills, powders, and granules. In such solid compositions one or more of the active compounds is, or are, admixed with at least one inert diluent such as starch, sucrose or lactose. The compositions may also comprise, as is normal practice, additional substances other than inert diluents, e.g. lubricating agents, such as magnesium stearate. Liquid compositions for oral administration include pharmaceutically-acceptable emulsion, solution, suspensions, syrups and elixers containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of ab sorbable material such as gelatin containing one or more of the active substances with or without the addition of diluents or excipients.

Preparations according to the invention for parenteral administration, include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved or dispersed in sterile water or some other sterile injectable medium immediately before use.

Compositions for rectal administration are suppositories which may contain, in addition to the active substance, excipients such as cocoa butter, a suitable wax base or solidified glycerin. For local application the compositions may be formulated in the usual way, for example, as vaginal tablets, which will be the most frequently used form.

The percentage of active ingredient in the compositions of the invention may be varied, it being necessary that it should constitute a proportion such that a suitable dosage shall be obtained. The dosage will depend upon the therapeutic effect sought, the route of administration, the length of treatment, and the species of animal. In human therapy the compositions should generally be administered so as to give, in the case of oral administration or local application, between 100 and 400 mg. of active substance per day.

The following examples illustrate pharmaceutical compositions according to the invention.

Example XLIV

Tablets for oral administration are prepared, by the usual method, having the following compositions:

(1)

| | Mg. |
|---|---|
| 2 - N - (2 - hydroxyethyl)carbamoyl - 1 - methyl - 5-nitropyrrole | 125 |
| Starch | 84 |
| Colloidal silica | 50 |
| Magnesium stearate | 5 |

(2)

| | Mg. |
|---|---|
| 1 - methyl - 2 - morpholinocarbonyl - 5 - nitropyrrole | 100 |
| Starch | 173 |
| Colloidal silica | 70 |
| Magnesium stearate | 7 |

(3)

| | Mg. |
|---|---|
| 2-N-ethylcarbamoyl-1-methyl-5-nitropyrrole | 125 |
| Starch | 84 |
| Colloidal silica | 50 |
| Magnesium stearate | 5 |

(4)

| | Mg. |
|---|---|
| 2 - N - (2 - hydroxypropyl)carbamoyl - 1 - methyl-5-nitropyrrole | 100 |
| Starch | 173 |
| Colloidal silica | 70 |
| Magnesium stearate | 7 |

Example XLV

Tablets for oral administration are prepared by the usual method having the following compositions:

| | (1) Mg. | (2) Mg. |
|---|---|---|
| 2-Carbamoyl-1-methyl-5-nitropyrrole | 125 | 100 |
| Starch | 84 | 173 |
| Colloidal silica | 50 | 70 |
| Magnesium stearate | 5 | 7 |

As has been mentioned before, the nitropyrrole derivatives of Formula I are useful against infections caused by histomonas. Histomoniasis (blackhead) is a disease in poultry, in particular turkeys, caused by the protozoan parasite, *Histomonas meleagradis*. The treatment and prevention of this disease is of utmost importance for the successful rearing of turkeys and recently a great deal of research has been carried out to find compounds useful in the treatment of the disease. The nitropyrroles of the present invention, in particular 2-carbamoyl-1-methyl-5-nitropyrrole, have been found in tests to be very efficacious in the treatment and prevention of histomoniasis.

According to another feature of the present invention, there is therefore provided as a new composition of matter suitable for the treatment or prevention of histomoniasis an animal foodstuff comprising, as an active ingredient, one or more nitropyrrole compounds of Formula I or non-toxic acid addition salts thereof. The animal foodstuff, i.e. an organic or mineral substance which is intended to be fed to animals, may be solid or semi-solid. Incorporation of the active ingredient in the foodstuff, which in the case of turkeys may be a commercial starting or growing mash, may be effected by any conventional method such as stirring, tumbling or grinding. In this manner, by altering the ratio of carrier to active ingredient, compositions of varying concentrations can be prepared. The nitropyrrole may be incorporated in the foodstuff in the form of a powder containing it and a solid, physiologically innocuous carrier, e.g. talc, kaolin, calcium phosphate or calcium carbonate or a diatomaceous earth such as kieselguhr, or a mixture thereof.

The amount of active ingredient required in the animal foodstuff for effective prophylactic control of histomoniasis is very low. Good results have been obtained by the administration of a quantity of the active ingredient equal to about 0.001% to 0.1% by weight of the food consumed. Optimum results are usually obtained by the daily administration of a quantity of active ingredient equal to about 0.005% to about 0.05% by weight of the food consumed.

Whilst the concentration of the nitropyrrole compound in the animal foodstuff will generally not exceed 0.1% it is within the scope of the invention to provide animal food concentrates which contain the nitropyrrole compound in quantities between 0.1% and 50% and which are mixed by the user with further quantities of animal foodstuff to produce a feed having a desired concentration of nitropyrrole compound.

According to a further feature of this invention, there are provided concentrates suitable for addition to animal foodstuffs and drinking water comprising one or more nitropyrroles of Formula I or acid addition salts thereof in association with a surface active wetting, dispersing or emulsifying agent, with or without a physiologically innocuous carrier. By the term "physiologically innocuous carrier" as used in this specification and in the appended claims is meant a carrier which is not harmful to the animal organism on oral administration. These concentrates may be dissolved in water or are self-emulsifying with water. Examples of concentrates are (a) mixtures of the active nitropyrrole ingredient with a surface active wetting or dispersing agent, for example, sodium lauryl sulphate or polyoxyethylene (20) sorbitan mono-oleate, (b) powders comprising the active ingredient, a physiologically innocuous carrier, e.g., sucrose, glucose or inorganic salts such as potassium sulphate, and a surface active wetting or dispersing agent, and (c) stable dispersions or solutions obtained by mixing concentrates of types (a) or (b) with water. The concentrates may also be in the form of a solution of the nitropyrrole compound in an organic water-miscible solvent medium which, when diluted with sufficient water to give a stable dispersion or solution suitable for administration to poultry, is physiologically innocuous. Preferably these concentrates are added to drinking water to provide a concentration of active ingredient between 0.005% and 0.1% by weight.

Such compositions of the invention may contain one or more additional known histomonocides, for example, furazolidone. Also they may contain substances known to be useful in promoting the growth of poultry such as, for example, vitamins, antibiotics such as the penicillins and salts thereof, for example procaine salts, and tetracyclines, and mineral supplements, for example, manganese.

The efficacy of 2-carbamoyl-1-methyl-5-nitropyrrole in the control of histomoniasis has been demonstrated by trials on turkeys. Turkey poults, of mixed sex 14 or 25 days old, were infected by oral dosing with 700–1000 embryonated *Heterakis gallinoe* ova. The aforesaid nitropyrrole was thoroughly mixed in turkey starter mash at a concentration of 0.01% and fed to the poults for 21 days commencing 2 days before infection. At the end of the 21 days all poults had survived. Unmedicated mash was given to the poults for a further ten days and then the poults were killed and autopsy examinations were made for lesions of infectious enterohepatitis. All the poults were found at the post mortem to have no lesions. In comparison, turkey poults used as controls similarly infected and given unmedicated mash all died.

The following examples illustrate this aspect of the present invention.

Example XLVI

A mixture is prepared containing 22.5% 2-carbamoyl-1-methyl-5-nitropyrrole, 10% calcium phosphate and 67.5% calcium carbonate, the percentages being by weight. The mixture after grinding is incorporated in a suitable foodstuff for turkeys to give a final concentration of about 0.01%.

The treated foodstuff is suitable for feeding to turkeys in the treatment or prevention of histomoniasis.

Example XLVII 2-carbamoyl-1-methyl-5-nitropyrrole (13 g.), sucrose (84 g.) and sodium lauryl sulphate (3 g.) are mixed and ground together. The resulting mixture, when dissolved in drinking water suitable for turkeys at the rate of 7 g. per 4500 cc., provided a concentration of about 0.02% of active substance in the drinking water.

Example XLVIII 1 part by weight of 2-carbamoyl-1-methyl-5-nitropyrrole is mixed with 10,000 parts by weight of turkey starter mash to form a foodstuff suitable for administration to turkeys to prevent or treat infection by *Histomonas maleagradis*.

I claim:
1. 2 - N-(2-hydroxypropyl)carbamoyl-1-methyl-5-nitropyrrole.
2. 2-N-methylcarbamoyl-1-methyl-5-nitropyrrole.
3. 2-N-ethylcarbamoyl-1-methyl-5-nitropyrrole.
4. 2-N,N-diethylcarbamoyl-1-methyl-5-nitropyrrole.
5. 1-(2-hydroxyethyl)-2-carbamoyl-5-nitropyrrole.
6. A 5-nitropyrrole derivative of the formula:

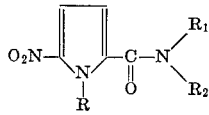

wherein R is methyl or 2-hydroxyethyl, $R_1$ is hydrogen, methyl, or ethyl, and $R_2$ is methyl, ethyl, 2-hydroxypropyl, or, when R is 2-hydroxyethyl, $R_2$ is hydrogen.

References Cited

UNITED STATES PATENTS 2,962,503   11/1960   Waller et al. _____ 260—326.3

OTHER REFERENCES

Pierre Fournari Bull Soc. Chem. France pp. 488–91 (1963).

NICHOLAS S. RIZZO, *Primary Examiner.*

JOSE TOVAR, *Examiner.*